United States Patent [19]

Diepstraten

[11] Patent Number: 5,339,316
[45] Date of Patent: Aug. 16, 1994

[54] WIRELESS LOCAL AREA NETWORK SYSTEM

[75] Inventor: Wilhelmus J. M. Diepstraten, Diessen, Netherlands

[73] Assignee: NCR Corporation, Dayton, Ohio

[21] Appl. No.: 42,190

[22] Filed: Apr. 2, 1993

[30] Foreign Application Priority Data

Nov. 13, 1992 [GB] United Kingdom ............... 9223890

[51] Int. Cl.⁵ .................................................. H04J 3/02
[52] U.S. Cl. .................................................. 370/85.13
[58] Field of Search ............... 370/85.13, 85.1, 85.2, 370/85.3, 108, 60, 94.1; 379/61; 340/825.5, 825.51

[56] References Cited

U.S. PATENT DOCUMENTS

| | | | |
|---|---|---|---|
| 4,725,834 | 2/1988 | Chang et al. | 340/825.5 |
| 4,879,740 | 11/1989 | Nagashima et al. | 379/61 |
| 5,042,083 | 8/1991 | Ichikawa | 370/85.3 |
| 5,164,941 | 11/1992 | Delaney et al. | 370/85.3 |

FOREIGN PATENT DOCUMENTS 0281334  2/1988  European Pat. Off. .

OTHER PUBLICATIONS

IEEE INFOCOM '92, vol. 2 of 3, pp. 626–632, Aug. 1992, Folorence.

Primary Examiner—Douglas W. Olms
Assistant Examiner—Dang Ton
Attorney, Agent, or Firm—James M. Stover

[57] ABSTRACT

A local area network system includes a wired backbone LAN (12) and at least one wireless LAN (14) cooperating with the backbone LAN (12) via an access point (22), which has a bridging function. When a source station (30) in the wireless LAN (14) transmits a packet to another station in the wireless LAN (14), the destination station should respond with an ACK signal. If no ACK signal is received by the source station, the packet is retransmitted. The access point (22) also receives the transmitted packet and if the access point (22) does not detect an ACK signal on the wireless channel', the access point (22) itself generates an ACK signal and retransmits the packet on the wireless LAN (14) or forwards the packet to the wired LAN (12) according to the packet destination address.

11 Claims, 8 Drawing Sheets

WIRELESS LOCAL AREA NETWORK SYSTEM

This invention relates to local area network systems. The invention relates in particular to a method for operating a local area network system of the kind including a wired local area network connected via bridging means to a wireless local area network having a plurality of wireless stations communicating over a wireless channel.

BACKGROUND OF THE INVENTION

With a view to obviating the need for wired cabling connections between stations in local area networks (LANs), wireless local area networks have been developed and are now commercially available. However, the coverage area of wireless LANs is restricted especially in an indoor environment, due to the presence of structural features such as walls and floors in buildings, for example. Also, it may be desirable for stations in a wireless LAN to communicate with remote facilities or resources such as servers. Therefore, it has been proposed to connect the wireless LAN via a bridging means to a wired LAN, which can be connected to the remote facilities and/or other wireless LANs.

One problem with implementing wireless LANs is to provide a suitable access protocol for stations desiring access to the wireless transmission medium. One known standard protocol utilized in wired LANs is CSMA/CD (carrier sense multiple access with collision detection). However, the CSMA/CD protocol cannot be satisfactorily implemented in a wireless environment because of the very high dynamic range of the signals on the wireless medium. One protocol which has been successfully implemented in a wireless environment is a CSMA/CA (carrier sense multiple access with collision avoidance) type of protocol. Such a protocol does not guarantee collision-free operation and it is still possible for packets on the wireless medium to be lost, especially during times of high traffic load. Also, interference may derive from other causes, such as other nearby networks using the same frequency band, or sources which generate frequency components in the band. Such interference also may affect the reliability of packet transmission in a wireless LAN.

OBJECTS OF THE INVENTION

It is an object of the present invention to provide a method of the kind specified which is robust for lost packets resulting from medium access collisions and interference of other sources including other networks using the same frequency band.

SUMMARY OF THE INVENTION

Therefore, according to one aspect of the present invention, there is provided a method of operating a local area network system, including a wired local area network connected via bridging means to a wireless local area network having a plurality of wireless stations communicating over a wireless channel, characterized by the steps of: transmitting from a source wireless station included in said wireless local area network an information packet; receiving said information packet at said bridging means; sensing, at said bridging means whether a signal is present on said wireless channel during a predetermined time interval following receipt of said information packet; and if not, transmitting from said bridging means an acknowledgment signal on said wireless channel if said information packet is validly received at said bridging means.

According to another aspect of the present invention, there is provided a local area network system, including a wired local area network connected via bridging means to a wireless local area network having a plurality of wireless stations communicating over a wireless channel, characterized in that said wireless stations include transmission means adapted to transmit information packets over said wireless channel; and in that said bridging means includes wireless transceiver means adapted to receive information packets transmitted over said wireless channel and to sense whether a signal is detected during a predetermined time interval following receipt of an information packet, said wireless transceiver means being adapted, if a signal has not been detected during said predetermined time interval, to transmit an acknowledgment signal on said wireless channel if said information packet is validly received at said bridging means.

The above and other objects, features, and advantages of the present invention will become apparent from the following description and the attached drawings.

DETAILED DESCRIPTION OF THE PREFERRED EMBODIMENT

Figure 1:
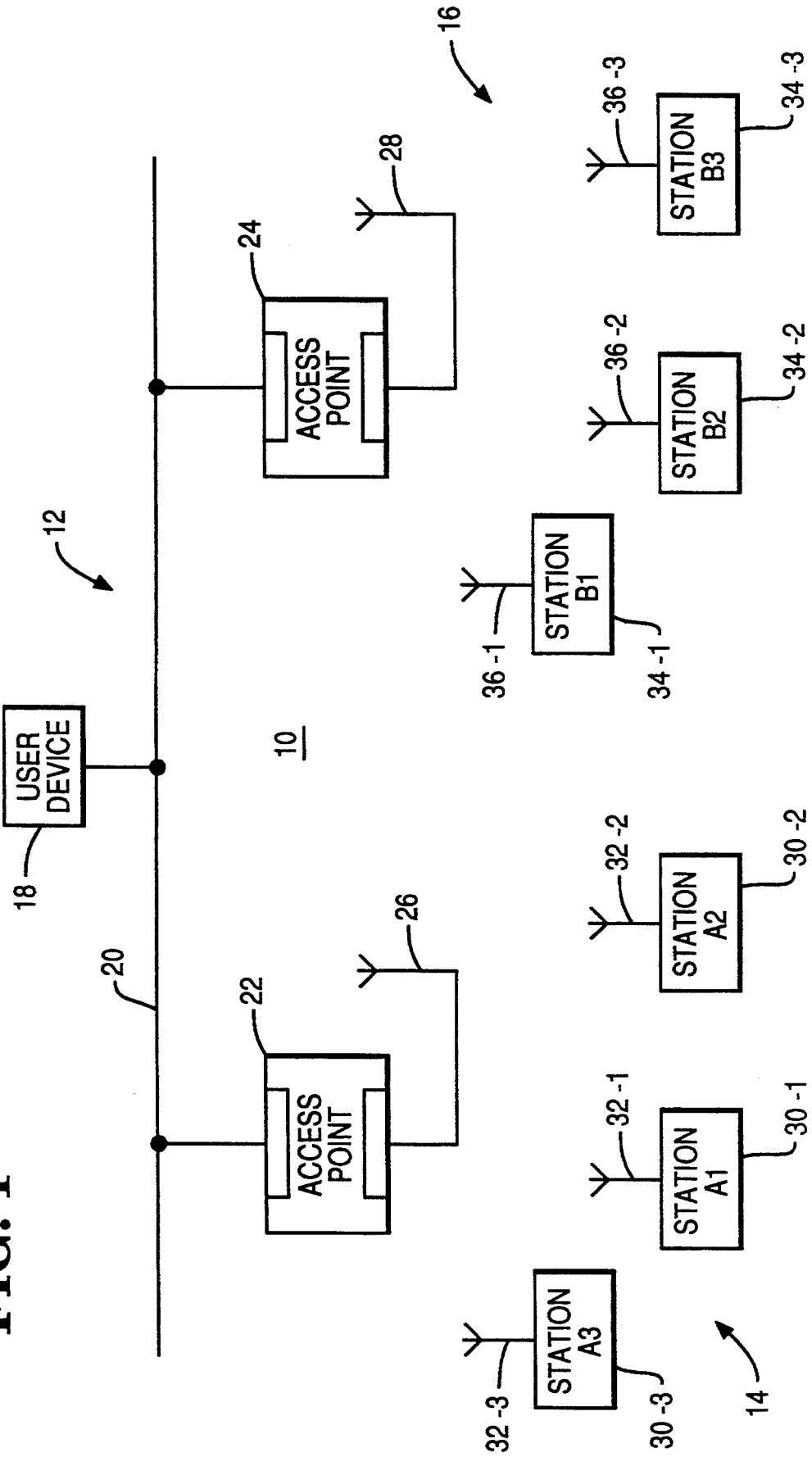
FIG. 1 is a block diagram of a local area network system including a wired backbone LAN cooperating with two wireless LANs.

Referring first to FIG. 1, there is shown a local area network system 10, which includes a wired backbone LAN 12, a first wireless LAN 14 and a second wireless LAN 16. Of course the number of wireless LANs is not restricted to two and any reasonable number of wireless LANs may be provided according to the requirements of the implementation.

The wired LAN 12 includes a user device 18, which may be a server, and which is coupled via the LAN cable 20 to access points 22, 24 having respective antennas 26, 28 for communicating with the wireless LANs 14 and 16, respectively. Of course, there may be more than one user device 18 provided in the LAN 12. It should be understood that the access points 22, 24 act as bridges between the wired LAN 12 and the wireless LANs 14, 16, respectively, by performing a packet forwarding and filtering function.

The wireless LAN 14 includes wireless stations 30, identified as stations A1, A2 and A3, referred to as stations 30-1, 30-2 and 30-3, respectively. The stations 30 have antennas 32, referred to individually as antennas 32-1, 32-2 and 32-3. Of course, any reasonable number of stations 32 may be included in the wireless LAN 14.

The wireless LAN 16 includes wireless stations 34, identified as stations B1, B2 and B3, referred to as stations 34-1, 34-2 and 34-3, respectively. The stations 34 have antennas 36, referred to as 36-1, 36-2 and 36-3, respectively. Again, any reasonable member of stations 34 may be included in the wireless LAN 16.

It should be understood that communication between the stations 30 of the wireless LAN 14 is generally on a peer-to-peer basis, that is, information packets are transmitted between the stations 30 directly, rather than via a common base station. This has the advantage of higher throughput. Of course, information packets transmitted by a station 30 which are destined for the user device 18 or one of the stations 34 in the network 16 are transmitted via the access point 22 and wired LAN 12.

Communication procedures for the wireless LAN 16 are identical to those for the wireless LAN 14. The wireless LANs 14, 16 have respective network identification codes associated therewith, which are incorporated into transmitted packets to ensure their correct routing within the system 10. The wireless LANs 14, 16 may operate on a common frequency channel, or may use different frequency channels to increase system capacity.

Figure 2:
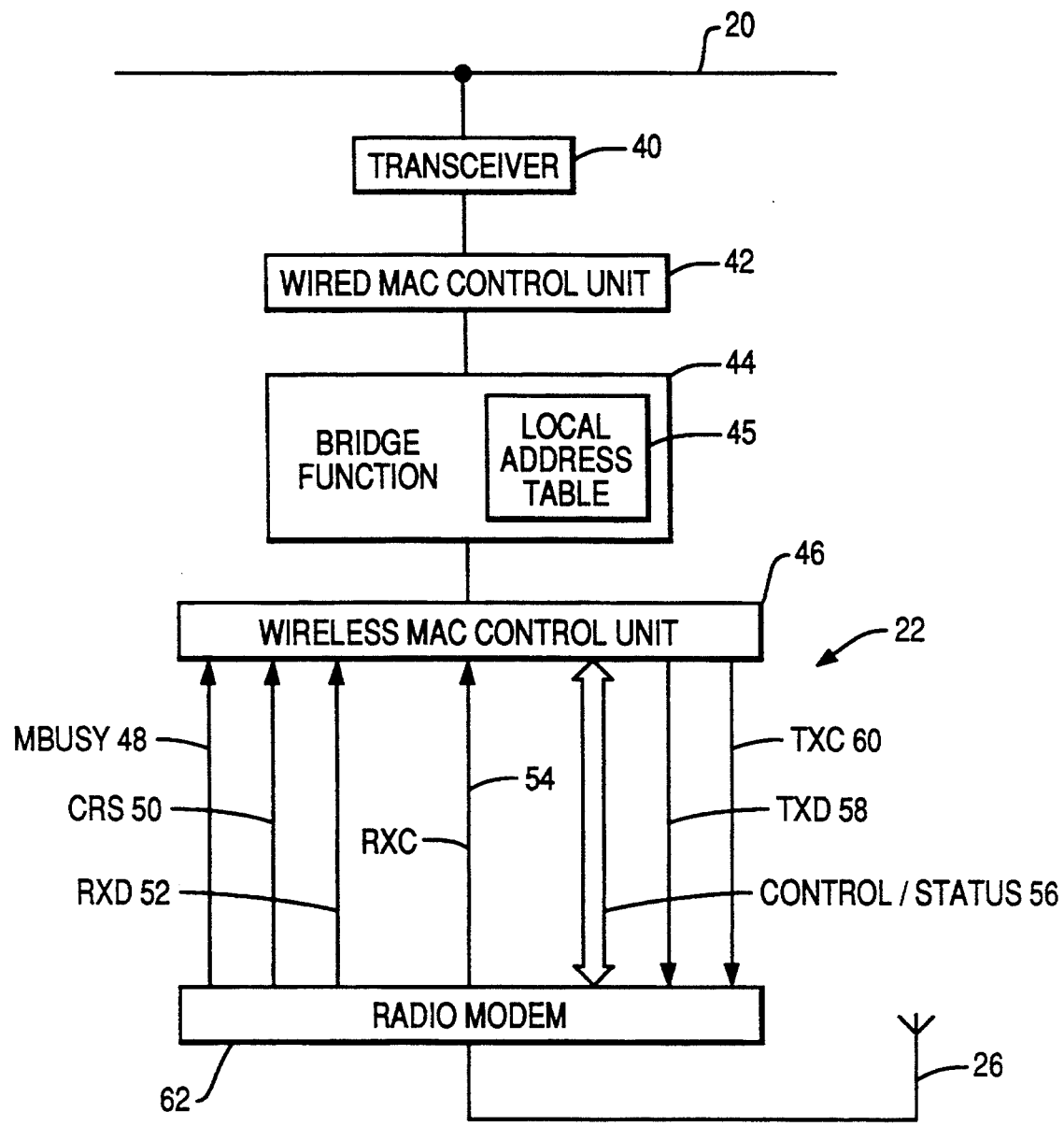
FIG. 2 is a block diagram of an access point included in the LAN system of FIG. 1.

Referring now to FIG. 2, there is shown a simplified block diagram of the access point 22. The access point 22 includes a transceiver 40 coupled to the wired LAN cable 20 and to a wired MAC (medium access control) control circuit 42. The bridging function performed by the access point 22 is represented by a bridge function block 44, which includes a local address table 45 and which cooperates with software in the wired MAC control unit 42 and a wireless MAC control unit 46. The local address table 45 is a software maintainable table of the addresses of the stations 30 currently in the LAN 14. The wireless MAC control unit is coupled via a plurality of signal lines 48 through 60 to a radio modem 62 which is coupled to the antenna 26. An MBUSY (medium busy) signal line 48, a CRS (carrier sense) signal line 50, an RXD (receive data) line 52 which carries serial received data signals, an associated RXC (receive clock) line 54, a bus 56 which carries various control/status signals, a TXD (transmit data) line 58, which carries serial transmit data (TXD) signals and an associated transmit clock (TXC) line 60. The MBUSY signal is active when energy is detected on the wireless transmission channel whereas the CRS signal is active after receipt of a preamble portion of a transmitted packet.

Figure 3:
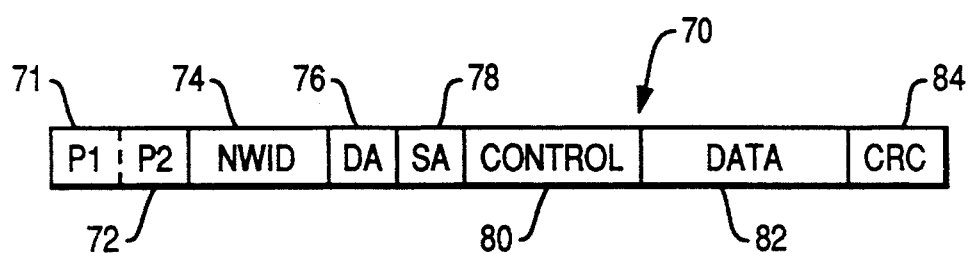
FIG. 3 is a diagram showing the format of an information packet.

Referring to FIG. 3, there is shown the format of a transmitted information packet 70. The information packet 70 includes a first preamble portion (PI) 71, a second preamble portion (p2) 72, a network identification (NWID) portion 74, a destination address (DA) portion 76, a source address (SA) portion 78, a control portion 80, which contains control information such as a packet sequence number and a packet length representation, a data portion 82 and a CRC check portion 84. It should be, understood that the first preamble portion 71 serves to synchronize the radio modem (62, FIG. 2) in the receiving unit, whereas the second preamble portion 72 is a conventional MAC preamble serving to synchronize byte boundaries. The MBUSY signal is activated at the start of the first preamble portion 71, whereas the CRS signal is activated at the start of the second preamble portion 72.

Briefly, each wireless LAN 14 or 16 operates using an acknowledgment protocol, wherein whenever an information packet is transmitted from a source station and successfully received at a destination station, an acknowledgment signal is sent back to the source station. If no acknowledgment signal is received by the source station within a predetermined acknowledgment window, this is recognized and the information packet is retransmitted after a random backoff period. Thus, the detection and recovery of packets lost from access collisions and/or interference at the destination receiver location, is achieved.

Figure 4:
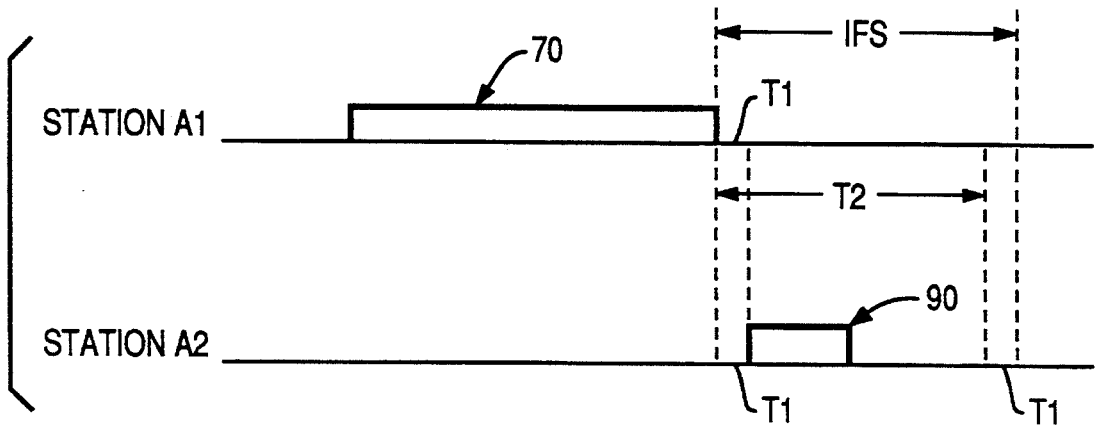
FIG. 4 is a timing diagram illustrating the operation of two wireless stations.

Referring now to FIG. 4, there is shown a timing diagram illustrating the acknowledgment procedure for transmission of an information packet from a typical source station A1 to a typical destination station A2, in the wireless LAN 14, FIG. 1. Thus, the station A1 transmits an information packet 70 (see FIG. 3), switches to a receive state during a short changeover time interval T1 and proceeds to sense the transmission medium. It should also be noted that at the termination of the transmission of the packet 70, an interframe spacing (IFS) time interval is generated. The IFS time interval is a predetermined time interval for the wireless LAN, representing the minimum time interval allowed between two transmitted information packets on the wireless transmission channel.

At the receiving station A2, if the packet is received with a correct CRC, then the station A2 will transmit without medium sensing an ACK (acknowledge) signal 90, which contains a preamble portion and a source address (SA) portion identifying the source address of the received information packet 70, the SA portion serving to direct the ACK signal to the station A1 which transmitted the information packet 70. The preamble portion is similar to the preamble portion 71,72 of an information packet (FIG. 3). If the station A1 detects the ACK signal 90 within an acknowledgment window T2 following the transmitted packet, then the transmitting station assumes that the packet 70 has been successfully received, and proceeds to transmit the next packet.

However, if no ACK signal is received within the acknowledgment window T2, then an error has occurred either in the original packet transmission, or in the ACK signal transmission. The station A1 will then retransmit the original packet 70 after a backoff period. The receiving station A2 compares the sequence number (included in the control information portion 80 of the packet 70) of the packet of the preceding received packet. If the sequence numbers are the same, the second packet is dropped. This condition occurs if the ACK signal 90 has been corrupted and not successfully received by the station A1.

A point to be noted here is that in a wireless transmission environment it is possible that the transmission of the ACK signal 90 may corrupt a transmission in a neighboring wireless network. For example, assume that, in the LAN 16 the station B3 is transmitting an information packet to the station B1. Then if the station B1 in the LAN 16 is out of effective range of the transmitting station A1 in the network 14, but within range of the station A2, the transmission of the ACK signal 90 by the station A2 may corrupt the reception by the station B1 of the information packet transmitted by the station B3. Such corruption, however, has a low probability, and should be compared with the guaranteed loss of the packet 70 transmitted in the LAN 14 if the station A2 deferred to the transmitting station B3 and failed to transmit the ACK signal 90 to the station A1. Consequently, unconditional transmission of the ACK signal, that is, transmission without medium sensing, such as takes place in the described embodiment is advantageous from a system throughput viewpoint.

A further point to be noted is that in all stations in the LAN 14 which hear the transmission of the packet 70 by the station A1, a timer having the duration of the IFS period is started at the end of the reception of the packet. Since stations that wish to access the medium have to wait until the IFS period has expired, this prevents the ACK signal transmitted by the destination station successfully receiving the information packet from being corrupted by collisions. It should be understood that the described acknowledgment procedure is disabled if stations are addressed in a broadcast or group addressing mode, since otherwise the ACK signals of the multiple addressed stations would collide.

Figure 5:
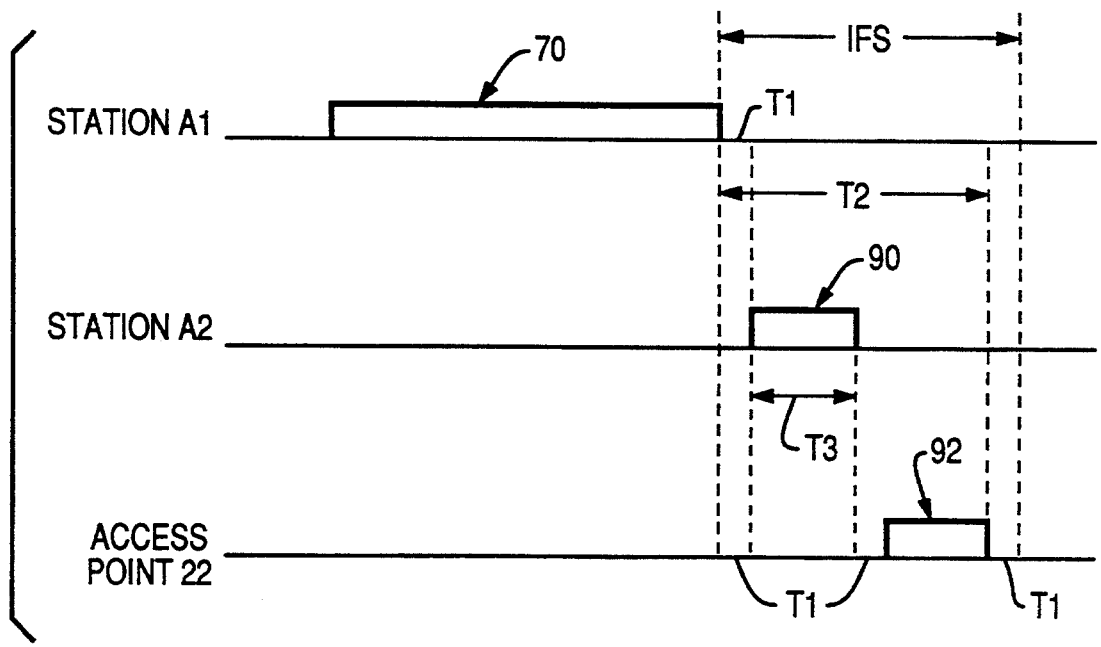
FIG. 5 is a timing diagram illustrating the operation of two wireless stations and the access point.
Figure 6A:
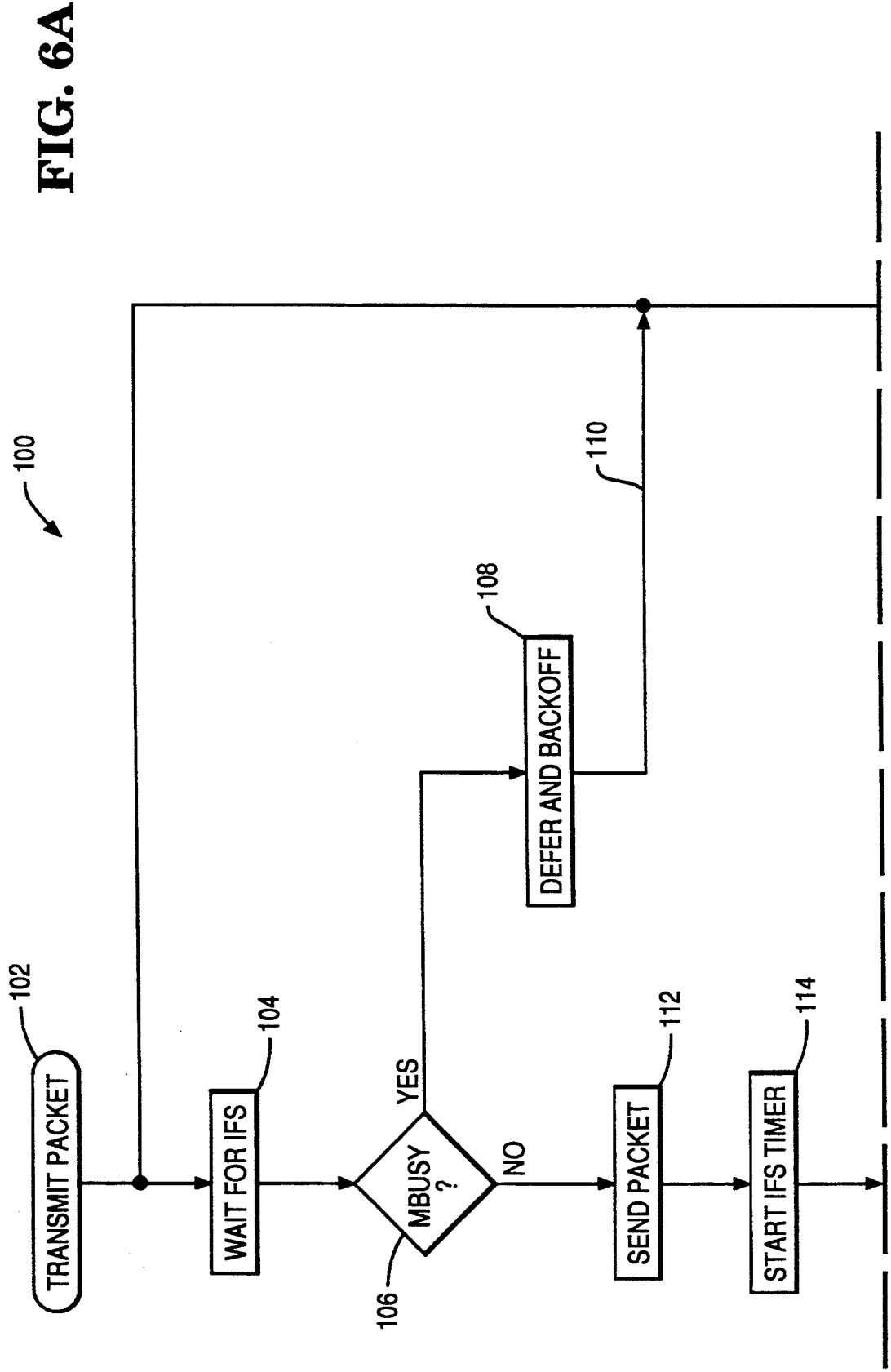
FIGS. 6A and 6B are a flowchart illustrating the operation or a wireless station and the access point, for transmitting an information packet.
Figure 6B:
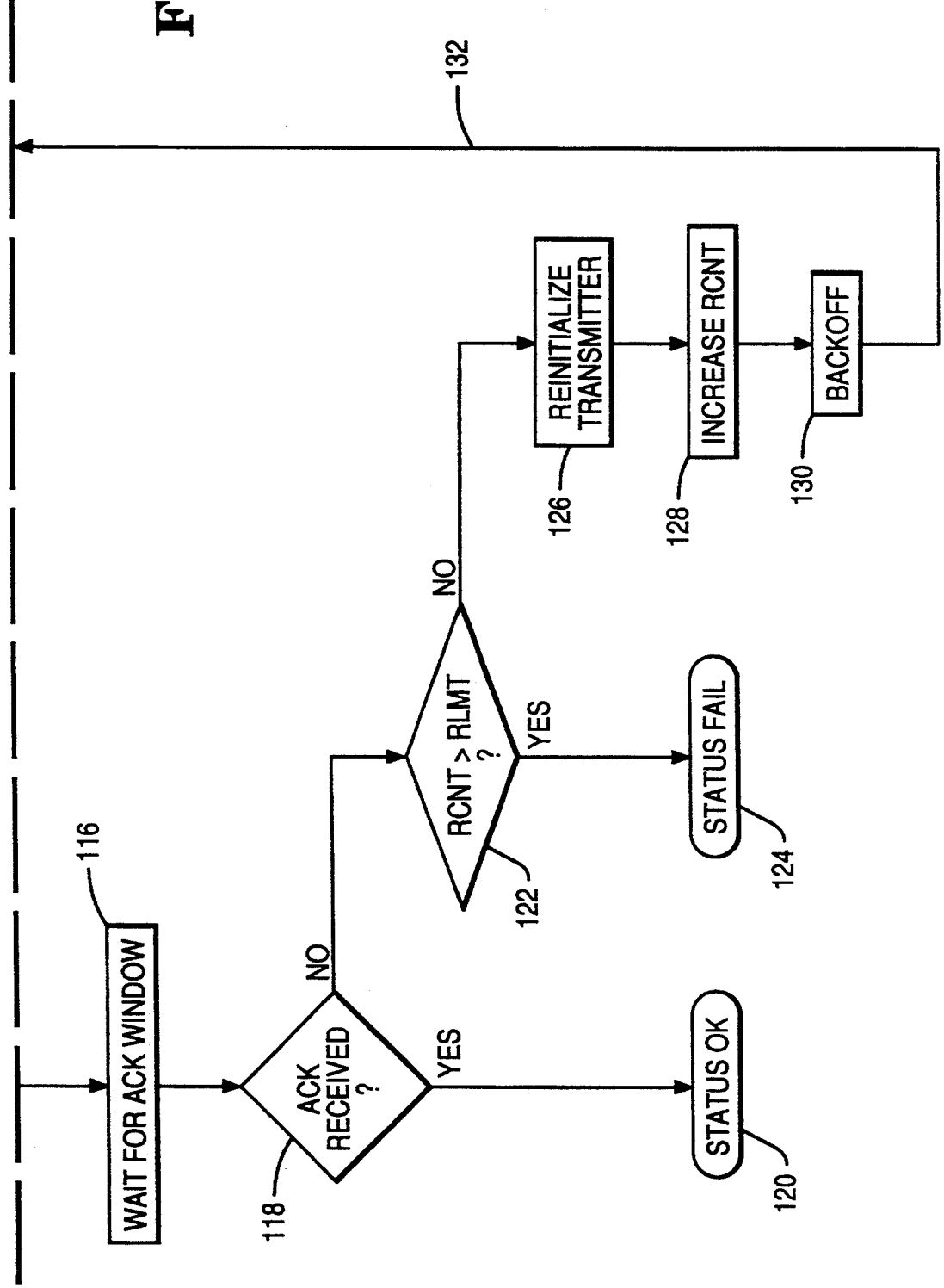

Referring now to FIG. 5, there is shown a timing diagram illustrating the acknowledgment procedure when the access point 22 is involved. As mentioned, the access point 22 executes a bridging function, in that the access point 22 listens to transmissions in the network 14 in a so-called promiscuous mode, wherein all packets transmitted in the network 14 are received by the access point 22, which builds a table maintaining the addresses of all the stations 30 in the network 14. Whenever a packet is received by the access point 22 from the network 14, then the access point 22 examines the destination address (DA) portion thereof. If this is not a local address in the network 14, then the packet is forwarded to the wired backbone LAN 12. The access point 22 also receives and monitors the traffic in the backbone LAN 12, in the so-called promiscuous mode, and whenever a packet is identified as having a destination address (DA) which is in the table 45 maintained in the access point 22, then such packet is transmitted to the LAN 14.

Assume now that a packet 70 is transmitted by the station A1. If the packet has a destination in the LAN 14, for example the station A2, then an ACK signal 90 is transmitted by that destination station if the packet is successfully received, as has been described hereinabove. This is shown in the second line of FIG. 5. Refer now to the third line of FIG. 5, where it is shown that the access point 22 establishes a further time interval T3, subsequent to time interval T1. During the time interval T3, the access point 22, in receive mode, checks whether an ACK signal, such as the ACK signal 90, FIG. 5, is received, such ACK signal being generated by a station in the network 14 which has successfully received a transmitted packet. If no such ACK signal is received, then the access point switches to transmit mode in a further changeover interval T1, and itself transmits an ACK signal 92, using the source address from the received packet. If the access point 22 does receive an ACK signal during the time interval T3 then no ACK signal is generated by the access point 22.

Where the access point 22 does generate an ACK signal, the access point 22 searches the address table 45 of stations in the network 14. If it finds that the destination of the received packet is in the table 45, then the packet is retransmitted by the access point 22 to the LAN 14. Thus, if a packet error has occurred in regard to a packet transmitted from a source to a destination station within the LAN 14, then such error is rectified by the access point 22 itself retransmitting the packet. It will of course, be appreciated that such retransmission is generally delayed compared to a retransmission by one of the stations 30, because of the time involved in accessing the table 45 in the access point 22. If the destination of the received packet is not found in the table 45, then the packet is forwarded to the wired LAN 12.

It will be appreciated that it is advantageous that the access point 22 generates an ACK signal to a station 30 in the LAN 14 within a short time interval after a packet is received without the significant delay which would be involved in accessing the table 45 in the access point 39 to determine whether or not the destination address in the packet relates to a station 30 in the LAN 14.

It will be appreciated that the described procedure has a further advantage in that the LAN 14 may be increased in size by the addition of further stations 30, even if the distance between two stations 30 is such that direct peer-to-peer communication between them is not possible, since the access point 22 automatically retransmits a packet which has not been received by its destination station in the LAN 14.

In a modification of the above procedure described with reference to FIG. 5, instead of determining whether or not an ACK signal is received during the time interval T3, it is merely detected whether a signal in the term of carrier energy on the wireless channel is received. With this arrangement a shorter time interval T3 can be utilized. If energy is detected during this shorter time interval T3, and is found to represent a valid ACK signal, then the access point 22 will not generate an ACK signal. If energy is not detected during the time interval T3, then the access point 22 will generate an ACK signal. The modified procedure has the advantage that a shorter time interval T2 can be used in the access point 22. It will be appreciated that with the modified arrangement the detected energy could be due to a transmission in another wireless network, such as the LAN 16, which the access point 22 can hear but the original transmitting station 30 in the LAN 14 did not hear (otherwise it would have deferred and not transmitted), and additional time would be needed at the access point 22 to determine whether or not the detected energy does derive from a valid ACK signal in the network 14.

Referring now to FIGS. 6 through 9, there are shown flowcharts representing state machine diagrams for implementing the procedures described hereinabove. These flowcharts are, of course, not applicable for messages transmitted in broadcast or group addressing mode, as mentioned hereinabove. Referring first to FIG. 6A and 6B, there is shown a flowchart 100 representing a state machine diagram for the transmission of a packet. The flowchart 100 is described for one of the stations 30, but is equally applicable to the access point 22. In response to a transmit packet request (block 102), the flowchart proceeds to block 104 where that station waits for the IFS (interframe spacing) time. It is then determined whether an MBUSY signal is present (block 106). If so, the stations defers and executes a backoff algorithm (block 108) and returns to the block 104 via the path 110. The defer and backoff function is typical for a CSMA/CA implementation. If there is no MBUSY signal, the packet is transmitted (block 112) and an IFS timer started (block 114). Next, the acknowledgment window, that is time interval T2 (FIGS. 4 and 5) is waited for (block 116) and it is determined whether an ACK signal is received (block 118). If so, the status is OK and the packet transmission procedure is terminated (block 120). If not, a determination as to whether a count value RCNT is greater than a limit count RLMT (block 122). If so, packet transmission has failed (block 124). If not, the transmitter is reinitialized (block 126), the RCNT value is increased by one (block 128), a backoff algorithm is executed (block 130) and the flowchart proceeds to the initial block 104 via path 132. It will be appreciated that retransmission of a packet is attempted a number of times up to a predetermined count value of RLMT, which is set such that the total retransmission time involved is less than the retransmission time values of higher layer protocols. In this connection it should be understood that higher layer protocols in the standard 051 (open systems interconnection) system are designed for cable systems where there is a very low packet error probability and generally have recovery procedures which are relatively slow, for example a 500 millisecond timeout period may be needed to detect that a packet has been lost.

Figure 7:
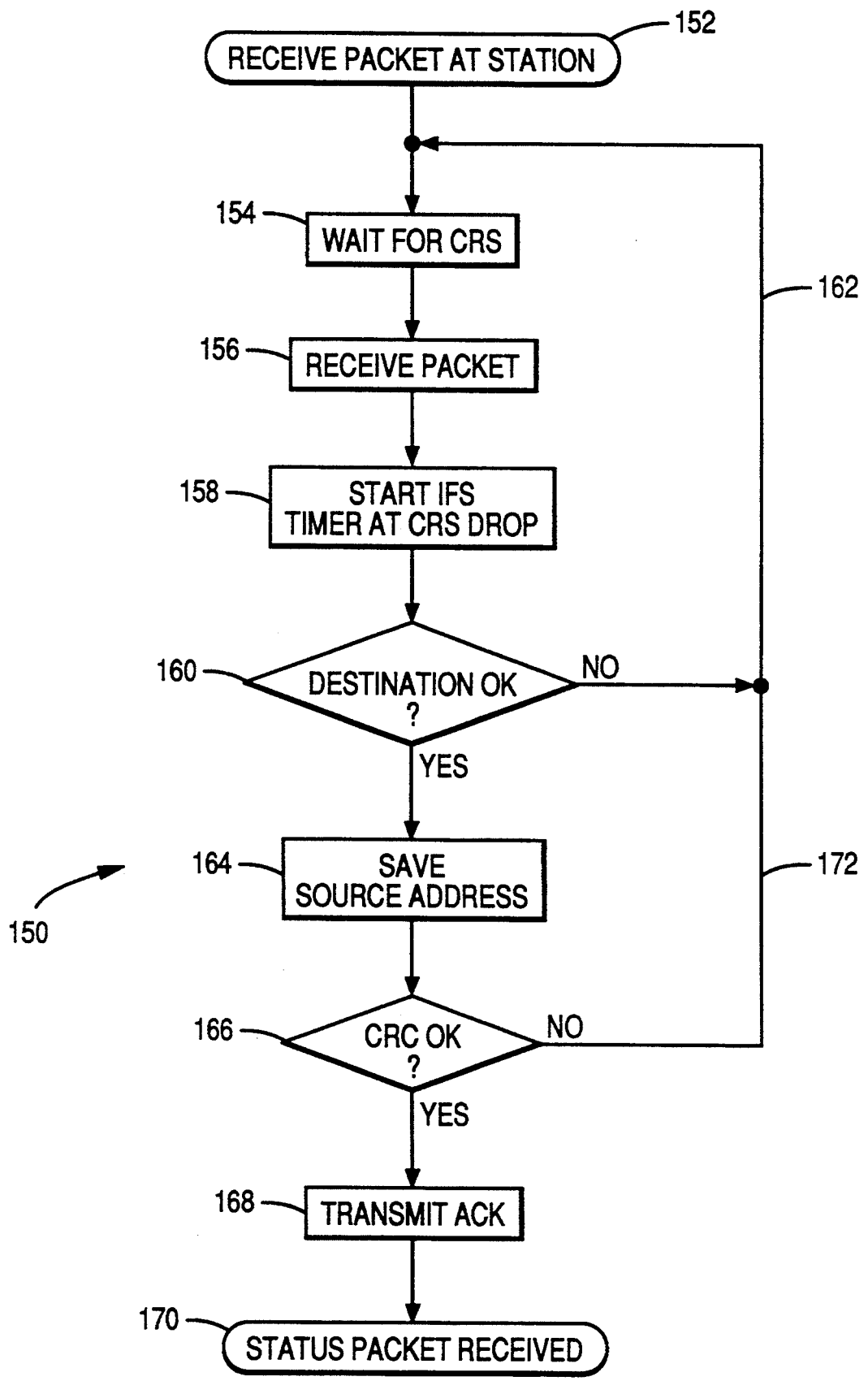
FIG. 7 is a flowchart illustrating the operation of a station for receiving an information packet.

Referring now to FIG. 7, there is shown a flowchart 150 for receiving a packet at one of the stations 30 (block 152). The station 30 waits for a CRS (carrier sense) signal (block 154) and then proceeds to receive a packet (block 156). At the termination of the CRS signal an IFS timer is set (block 158). A check is then made as to whether the destination address (DA) portion of the packet is for the receiving station. If not, the flowchart returns to block 154 over the path 162. If so, the source address of the packet is saved (block 164), a check is made as to whether the packet CRC is correct (block 166) and if the CRC is correct, an ACK signal containing the source address saved in block 164 is transmitted (block 168), and the flowchart terminates with a' packet received status (block 170). Note that ACK signal transmission takes place without channel sensing. If the CRC check indicates an error, the flowchart returns to the block 154 via the path 172.

Figure 8:
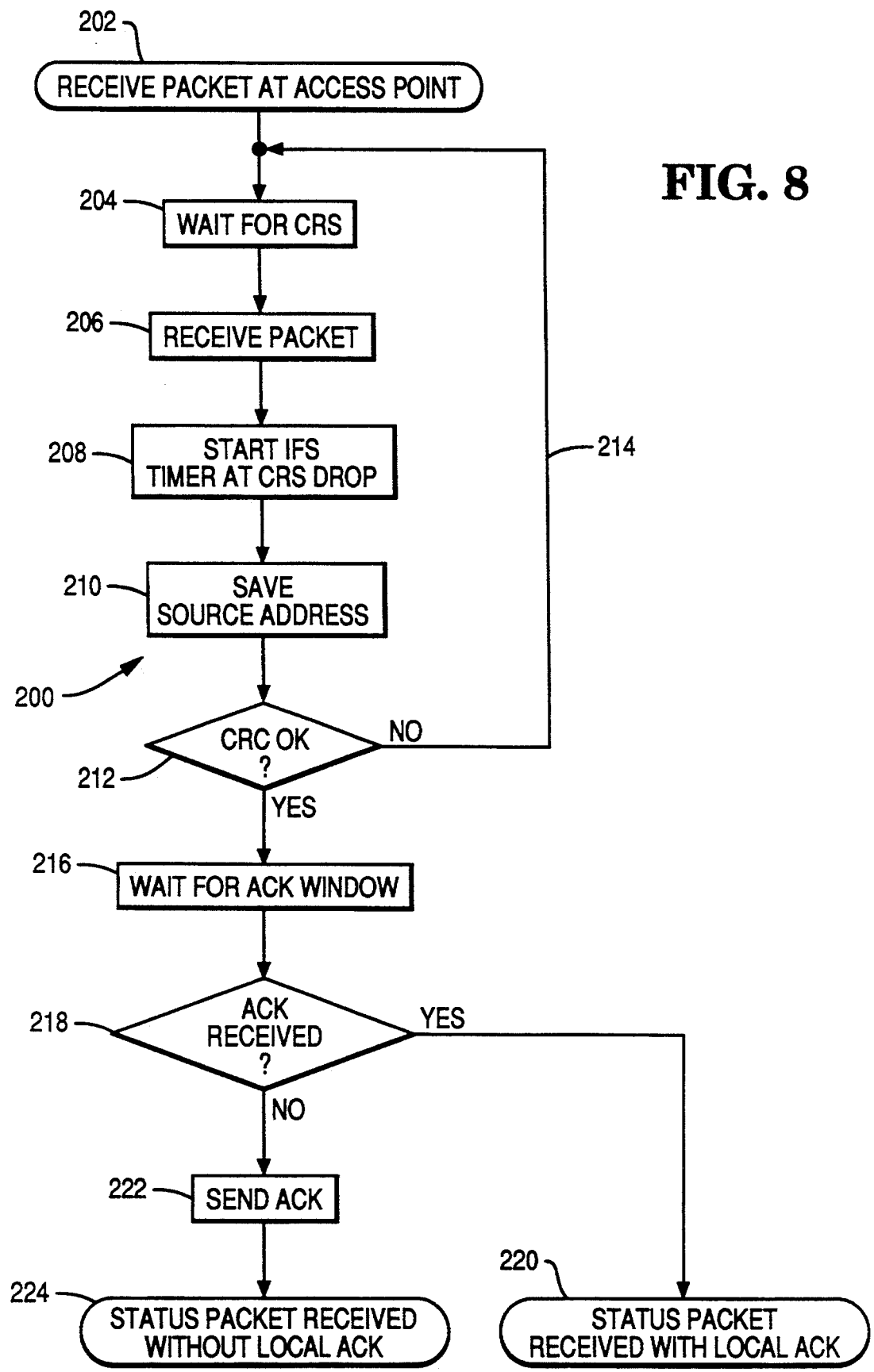
FIG. 8 is a flowchart illustrating the operation of the access point for receiving an information packet.

Referring now to FIG. 8, there is shown a flowchart 200 for the reception of a packet at the access point 22 (block 202). The access point 22 waits for a CRS (carrier sense) signal (block 204), and proceeds to receive the packet (block 206). An IFS (interframe spacing) timer is started (block 208) and the source address of the packet is saved (block 210). The packet CRC is checked (block 212) and if found incorrect, the flowchart returns to block 204 via path 214. Next, the access point switches to receive mode in time interval T1 and during a further time interval T3 senses the wireless channel. A determination is then made as to whether an ACK signal has been received (block 218). If so, the flowchart terminates with a status indicating that the packet has been received by the access point 22, but an ACK signal has been provided by the receiving station 30. If, in block 218, it is determined that an ACK signal has not been received in the time interval T3, then the access point transmits an ACK signal containing the source address saved in block 210, without sensing the wireless channel (block 222) and the flowchart terminates at block 224 with the status identifying that packet was received without an ACK signal having been generated by a station 30 in the LAN 14.

Figure 9:
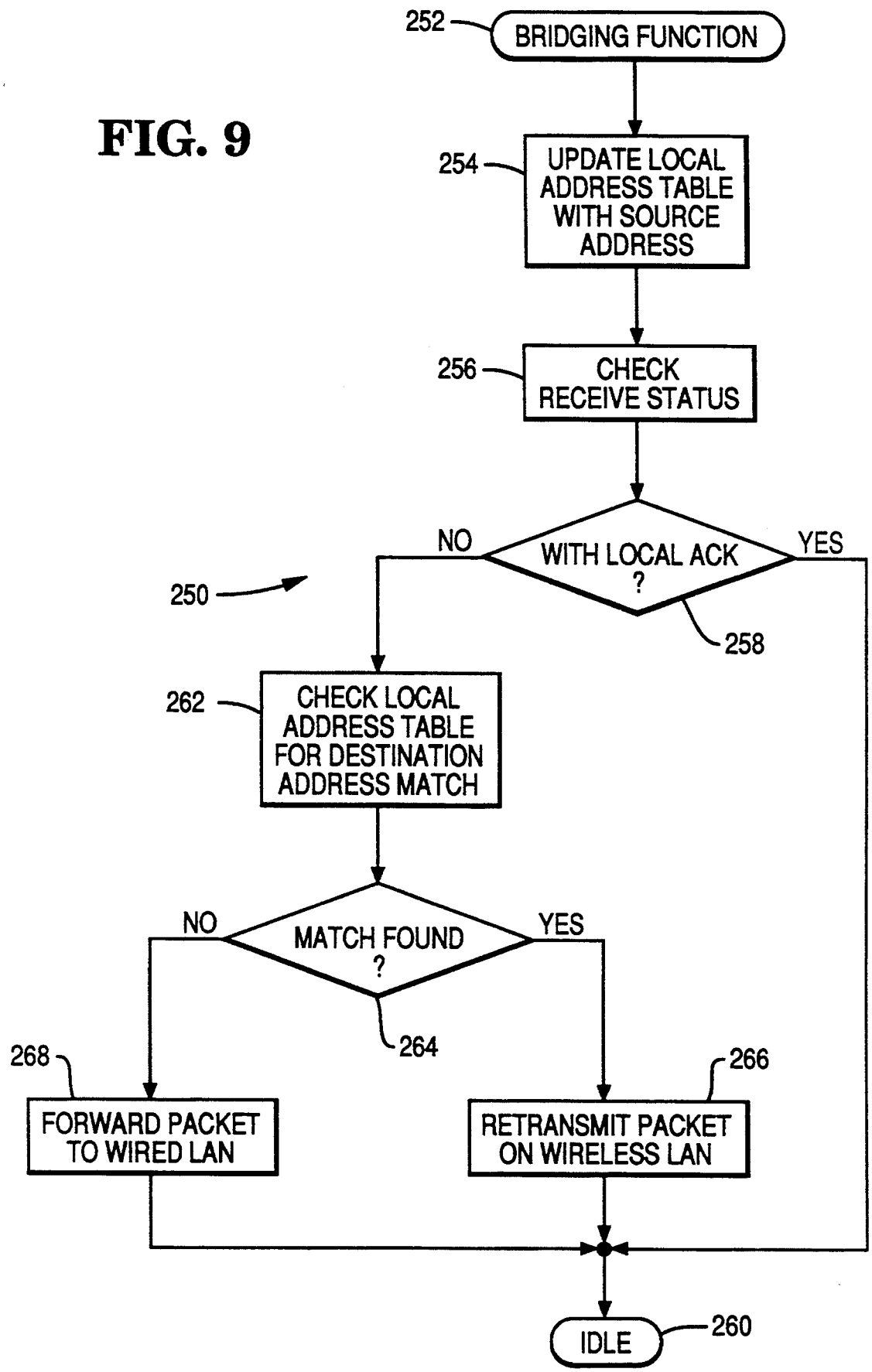
FIG. 9 is a flowchart illustrating the bridging function of the access point.

Referring finally to FIG. 9, there is shown a flowchart 250 representing a state machine diagram for the bridging function of the access point 22 (block 252). As shown in block 254, the access point 22 updates (if needed) its local address table 45 (FIG. 2) with the source address of the received packet (block 254), and the receive status (block 256), corresponding to blocks 220 and 224 in FIG. 8. If a local ACK signal was detected in the time interval T3, (block 258), then the flowchart proceeds to the idle state (block 260). If a local ACK signal was not detected, the flowchart proceeds to block 262 where the destination address (DA) portion of the received packet is checked in the local address table 45. If a match is found (block 264), the packet is retransmitted to the wireless LAN 14, and the flowchart proceeds to the idle status (block 260). If a match is not found, the packet is forwarded to the wired LAN 12 and the flowchart proceeds to the idle status (block 260).

Although the presently preferred embodiment of the invention has been described, it will be understood that various changes may be made within the scope of the appended claims.

What is claimed is:

1. A method of operating a local area network system (10), including a wired local area network (12) connected via bridging means (22) to a wireless local area network (14) having a plurality of wireless stations (30) communicating over a wireless channel; the method comprising the steps of:
   transmitting from a source wireless station (30) included in said wireless local area network (14) an information packet;
   receiving said information packet at said wireless stations (30) in said wireless local area network (14) and at said bridging means (22);
   sensing, at said bridging means (22) whether a first acknowledgment signal (90) transmitted from a destination wireless station (30) included in said wireless local area network (14) is present on said wireless channel during a predetermined time interval (T3) following receipt of said information packet;
   transmitting from said bridging means (22) a second acknowledgment signal (92) on said wireless channel if said information packet is validly received at said bridging means (22) and said first acknowledgment signal is not present during said predetermined time interval (T3); and
   retransmitting said information packet from said bridging means (22) over said wireless communication channel if no first acknowledge signal is detected during said predetermined time interval (T3) and if said information packet is destined for one of said wireless stations (30).

2. The method according to claim 1, further comprising the steps of:
   determining at said source (30) if a valid acknowledgment signal (90, 92) is received; and
   retransmitting said information packet if said valid acknowledgement signal 90, 92) is not received at said source station (30).

3. The method according to claim 2, wherein:
   said step of sensing includes the step of determining whether a valid first acknowledge signal (90) is received from said wireless channel during said predetermined time interval (T3).

4. The method according to claim 1, further comprising the steps of:
   maintaining in said bridging means (22) a table (45) of addresses of wireless stations (30) included in said wireless local network (14); and accessing said table (45) to determine whether said information packet is destined for one of said wireless stations (30).

5. The method according to claim 1, further comprising the step of:
  forwarding said information packet from said bridging means to said wired local area network (12) if no first acknowledge signal is detected during said predetermined time interval (T3) and if said information packet is not destined for one of said wireless stations (30).

6. The method according to claims 5, further comprising the steps of:
  maintaining in said bridging means (22) a table (45) of addresses of wireless stations (30) included in said wireless local network (14); and
  accessing said table (45) to determine whether said information packet is destined for one of said wireless stations (30).

7. A method according to claim 1, further comprising the step of:
  establishing at said wireless stations (30) an interframe spacing interval (IFS) during which said wireless stations (30) are inhibited from transmitting additional information packets following receipt of said information packet.

8. In a local area network system, including a wired local area network (12) connected via bridging means (22) to a wireless local area network (14) having a plurality of wireless stations (30) communicating over a wireless channel, the improvement comprising:
  said wireless stations (30) including transmission means (32) adapted to transmit information packets over said wireless channel;
  said bridging means (22) including wireless transceiver means (26,62) adapted to receive information packets transmitted over said wireless channel and to sense whether a first acknowledge signal (90) transmitted from a destination wireless station (30) included in said wireless local area network (14) is detected during a predetermined time interval (T3) following receipt of an information packet, said wireless transceiver means (26,62) being adapted to transmit a second acknowledgment signal (92) on said wireless channel of said information packet if an information packet is validly received at said bridging means (22) and if said first acknowledge signal has not been detected during said predetermined time interval (T3); and
  said bridging means (22) includes further transceiver means (40), whereby if no first acknowledge signal is detected in said predetermined time interval (T3), said information packet is retransmitted by said wireless transceiver means (26,62) over said wireless channel.

9. A local area network system according to claim 8, wherein:
  said bridging means (22) includes table means (45) adapted to store the addresses of stations (30) contained in said wireless local area network (14).

10. A local area network system in accordance with claim 8, wherein:
  said bridging means (22) includes further transceiver means (40) coupled to said wired local area network (12), whereby if no first acknowledge signal detected in said predetermined time interval (T3), said information packet is forwarded by said further transceiver means (40) to said wired local area network (12) in accordance with destination information included in said information packet.

11. A local area network system according to claim 10, wherein:
  said bridging means (22) includes table means (45) adapted to store the addresses of stations (30) contained in said wireless local area network (14).

* * * * *